United States Patent [19]

Adachi

[11] 4,031,448

[45] June 21, 1977

[54] MOTOR DRIVING SYSTEM AND CIRCUIT THEREFOR

[75] Inventor: Yoshio Adachi, Kodaira, Japan

[73] Assignee: Hitachi, Ltd., Japan

[22] Filed: Feb. 11, 1976

[21] Appl. No.: 657,235

[30] Foreign Application Priority Data

Sept. 26, 1975   Japan .............................. 50-115633

[52] U.S. Cl. ............................... 318/696; 318/685; 318/341

[51] Int. Cl.² ......................................... G05B 19/40

[58] Field of Search ........... 318/696, 685, 138, 341

[56] References Cited

UNITED STATES PATENTS

| | | | |
|---|---|---|---|
| 3,958,167 | 5/1976 | Nakajima et al. | 318/696 |
| 3,963,946 | 6/1976 | Zajac | 318/696 |
| 3,965,406 | 6/1976 | Yablonski | 318/696 |

Primary Examiner—B. Dobeck
Attorney, Agent, or Firm—Craig & Antonelli

[57] ABSTRACT

A system for driving a bipolar stepping motor by a pair of pulse driving currents wherein an output level of a control circuit is selected depending on one of the pulse drive currents applied just prior to the stoppage of the motor by a reset signal, switching of a set of signal transmitting paths for connecting between a reference signal generating circuit and a motor drive circuit is selected depending on an output level of the control circuit, that one of a pair of reference signals produced by the reference signal generating circuit during the operation of the motor which first appears after the release of the stop causes production of the other of the pulse drive currents by the selected path, and a predetermined time period after the release of the stop the pulse drive current of opposite polarity to that of the pulse drive current being applied to the motor which is just about to stop is applied to the motor to positively re-start the operation of the motor at a predetermined time.

17 Claims, 30 Drawing Figures

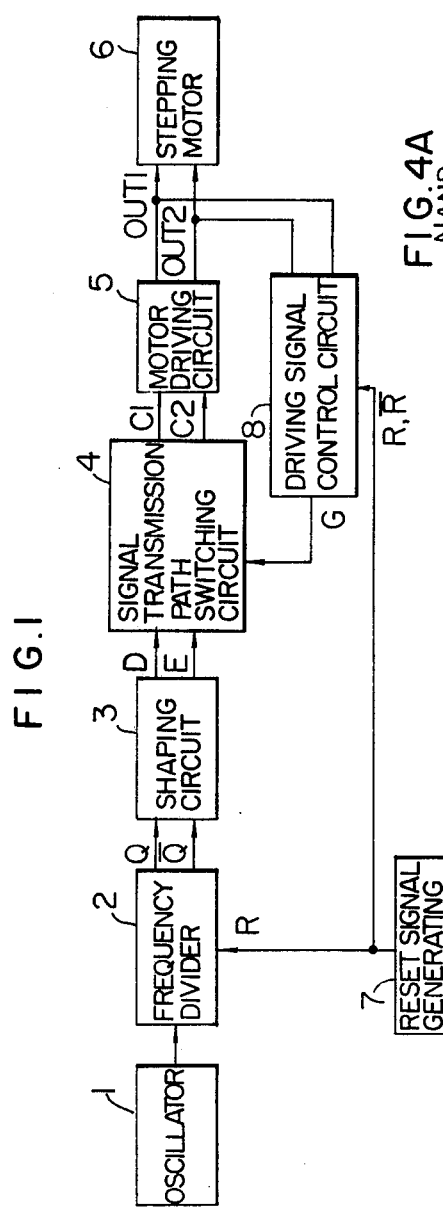
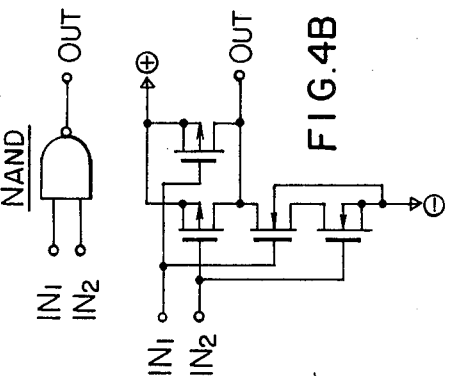
FIG. 1
FIG. 3A INVERTER
FIG. 3B
FIG. 4A NAND
FIG. 4B

NOR

ELECTRONIC CHANGE-OVER SWITCH

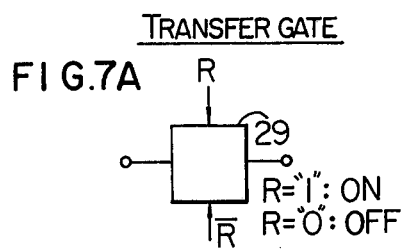
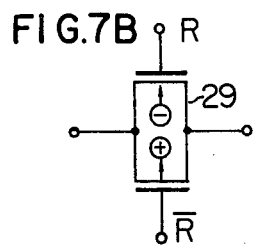
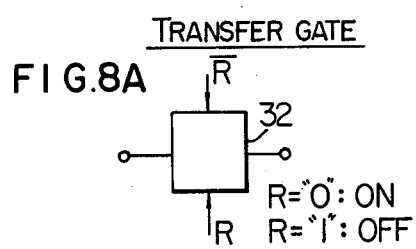
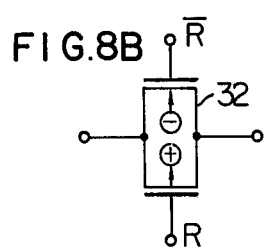
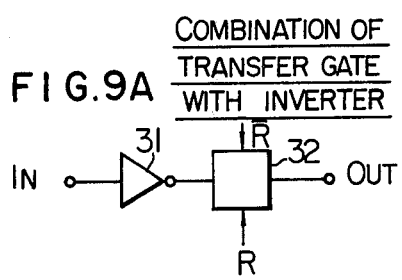
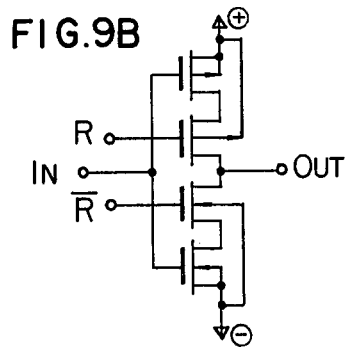
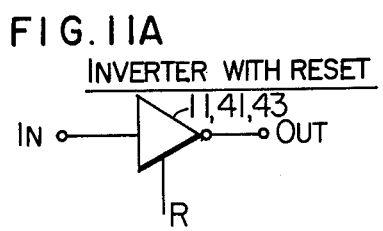
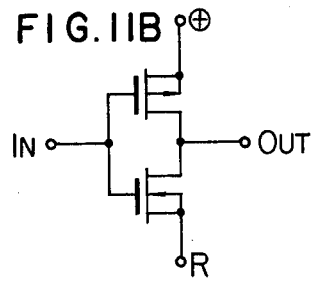

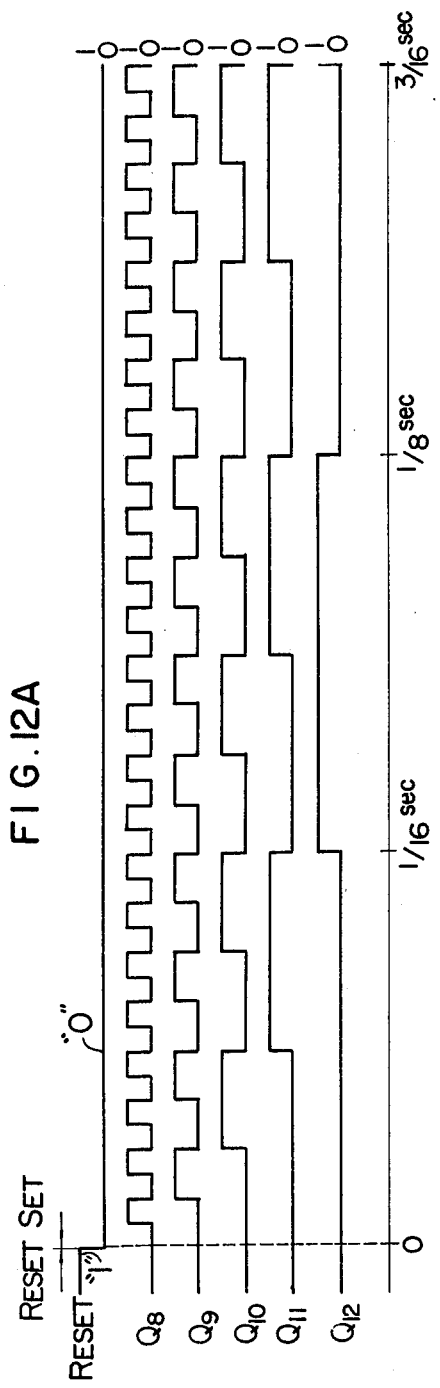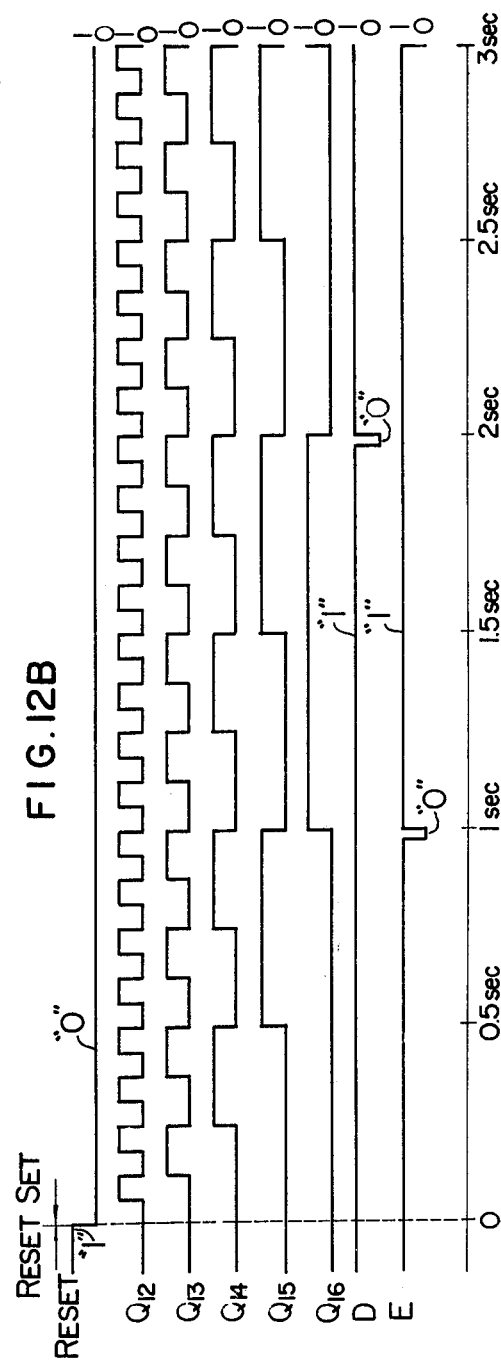

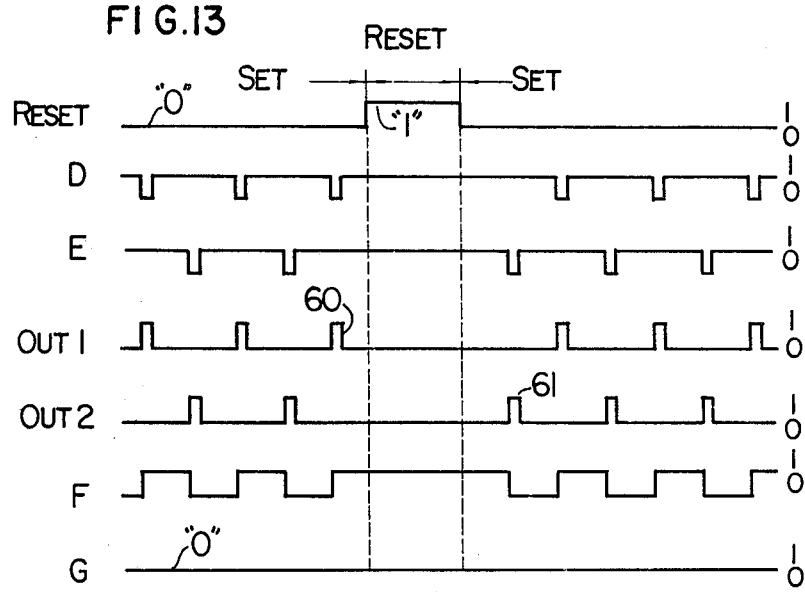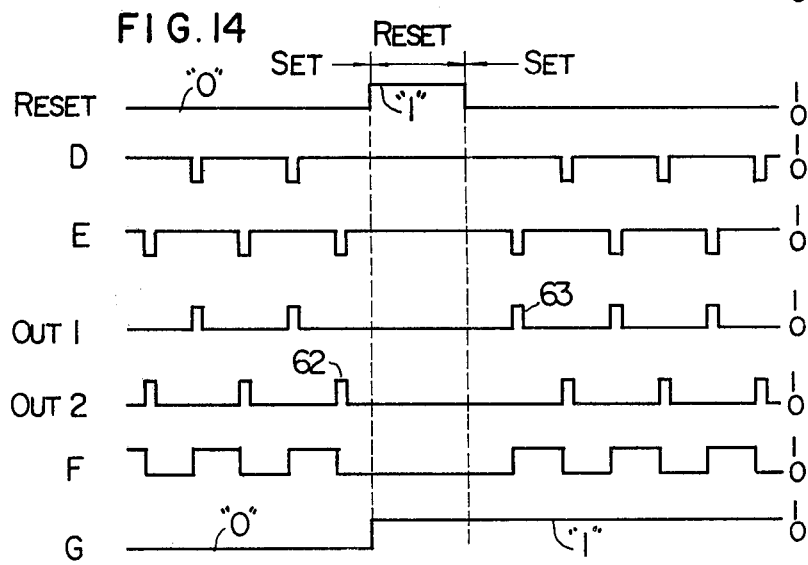

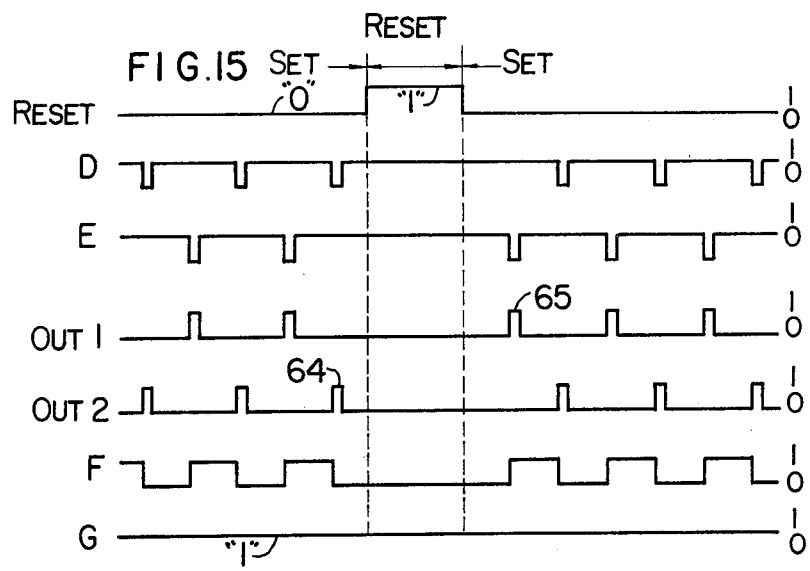
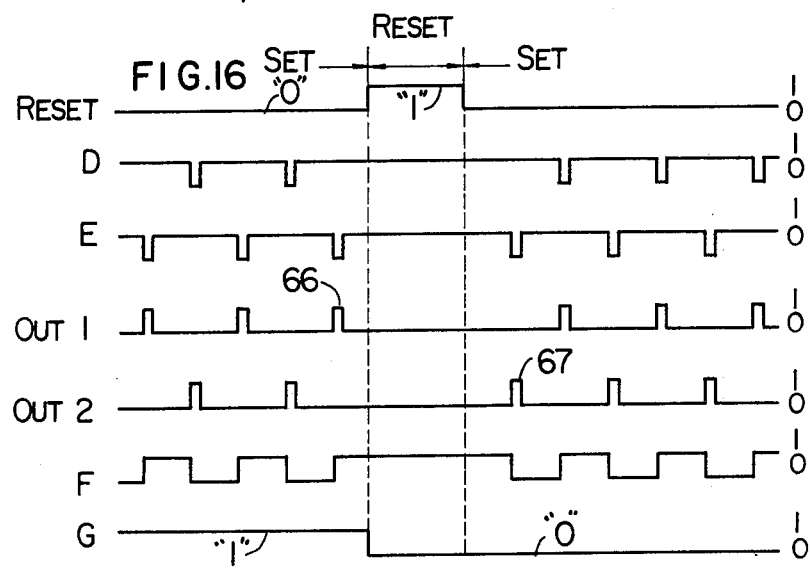

MOTOR DRIVING SYSTEM AND CIRCUIT THEREFOR

The present invention relates to a motor driving system and a circuit therefor, and more particularly to a driving system for a bipolar stepping motor driven by pulse currents and a circuit therefor.

In an electronic device such as a hand indication type electronic watch, which utilizes a moving magnet type strpping motor, it is required to reverse the direction of current fed to a stator coil for each stepping of the motor. When such a motor is temporarily stopped (reset) for the adjustment of time of the watch and subsequently re-started, it is desirable that the motor always starts to operate precisely at a predetermined fixed time period after the start instruction (reset release). In such a case that two pulse signals generated by dividing an electrical signal from a high precision oscillator using crystal or the like are used for driving the motor, the above requirement can be met by mechanically and forcibly adjusting the position of the moving magnet which is assumed when the motor is stopped, at a predetermined position. In this method, however, a high precision and complex mechanical adjusting mechanism for forcibly setting the moving magnet of the motor to the predetermined position if required and hence it has been difficult to provide a cheap and highly reliable electronic device.

In order to meet the above requirement by electrical means rather than mechanical means and to provide a highly reliable, small and cheap electronic device, the inventor of the present invention has prepared a major part of a required electric circuit on a single silicon wafer using a semiconductor integrated circuit (IC) technique. However, it has been proved that when a pulse signal of very high frequency derived from an oscillator is frequency divided by a frequency divider and an output signal from the frequency divider is passed to a shaping circuit to produce a predetermined pulse signal for driving the motor, undesired spiked noise or whisker pulse may be produced on a signal line by the delay or distortion of signal waveform due to the delay of the signal waveform in various gates and to the presence of parasitic impedance (stray capacitance and resistance) in various wiring and circuit components used in IC devices, and the stepping motor may erroneously be operated by the noise or whisker pulse.

It is an object of the present invention to provide a novel electrical driving system and circuit for driving a motor.

It is another object of the present invention to provide an electrical driving system and circuit for a bipolar stepping motor wherein the bipolar stepping motor havng been stopped by a reset signal can be caused to rotate at a predetermined time period after the reset release.

It is still another object of the present invention to provide an electronic circuit which does not erroneously operate in response to pulsive noise or whisker pulse.

It is a further object of the present invention to provide a highly reliable electronic circuit device for a hand indication type electronic watch, which uses a semiconductor integrated circuit technology.

In accordance with the present invention which accomplishes the above objects, there is provided a motor driving system comprising a reference signal generating circuit for generating a pair of reference signals of phase different from each other, a motor driving circuit responsive to said pair of reference signals for producing a pair of motor driving signals for causing drive currents of opposite polarity to be alternately fed to a motor, a signal transmission path switching circuit connected between said reference signal generating circuit and said motor driving circuit for switching the paths which transmit said reference signals to said motor driving circuit, a control circuit for receiving said motor driving signals at inputs thereof and supplying an output thereof as a control signal to said signal transmission path switching circuit, and a reset circuit connected to said reference signal generating circuit and said control circuit for generating a reset signal which deactivates said reference signal generating circuit and casues said control circuit to produce and maintain an output signal corresponding to the status of the motor driving signals, whereby the signal transmission path corresponding to the status of the motor driving signal at the time of the reset is selected and the reference signal is transmitted to the motor driving circuit through the selected signal transmission path at the release of the reset.

The above and other objects, features and advantages of the present invention will become more apparent from the following detailed description of the preferred embodiments of the invention when taken in conjunction with the accompanying drawings.

FIG. 1 is a block diagram showing a general configuration of a motor driving system of the present invention;

FIGS. 3A to 11B show various gates used in the logic circuit of FIG. 2 with symbols and specific circuit configurations being shown in pairs;

FIGS. 12A and 12B shows time charts for various signals for illustrating that the logic circuit of FIG. 2 produces a reference pulse a predetermined time after the release of reset;

FIGS. 13 to 16 are time charts for various signals for illustrating the operation of a control circuit in the logic circuit of FIG. 2.

Figure 2:
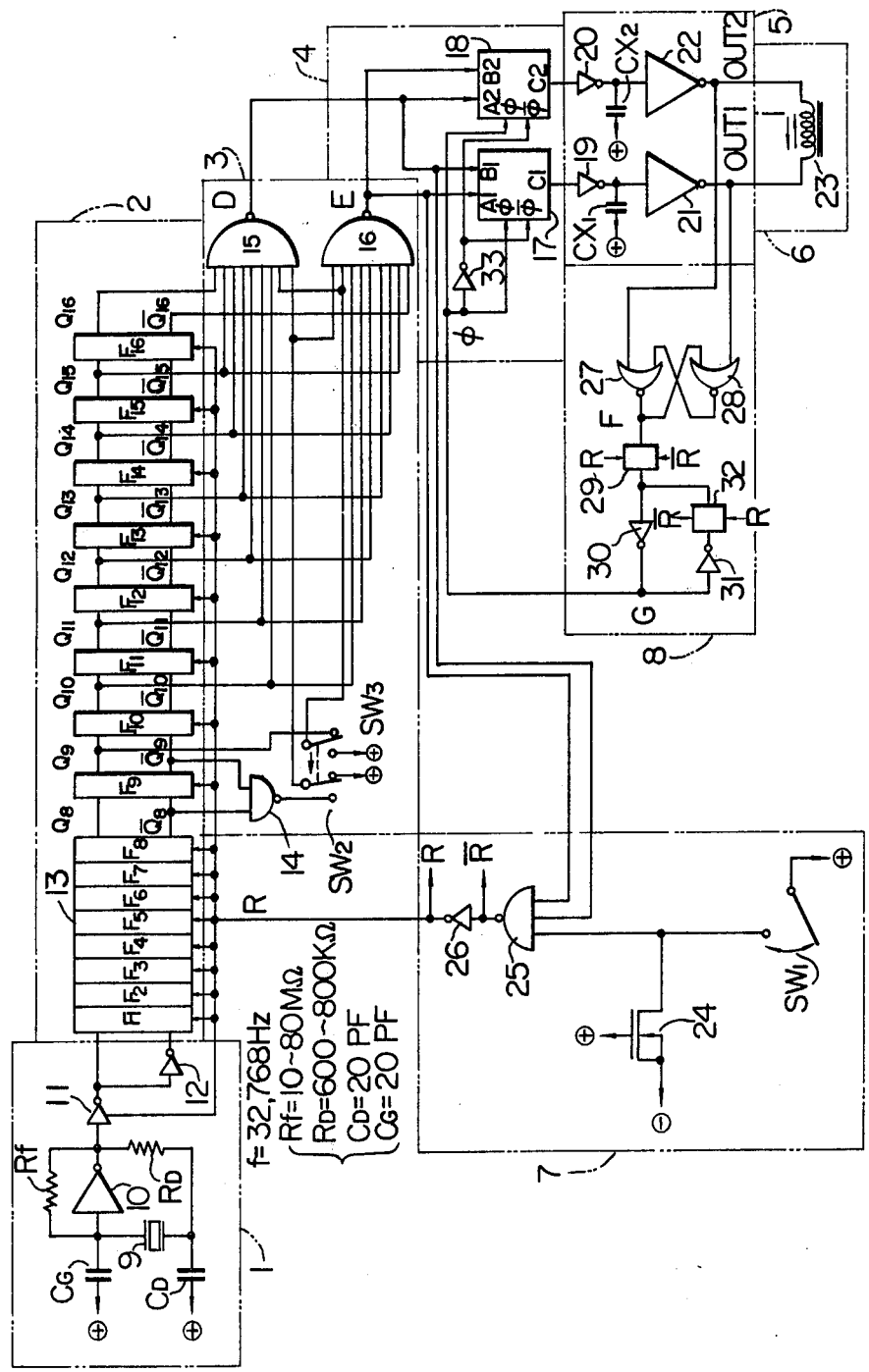
FIG. 2 is a logic diagram of one embodiment of the present invention which drives an electronic watch.
Figure 5A:
Figure 6A:
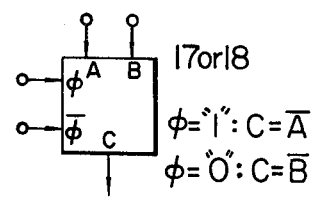
Figure 5B:
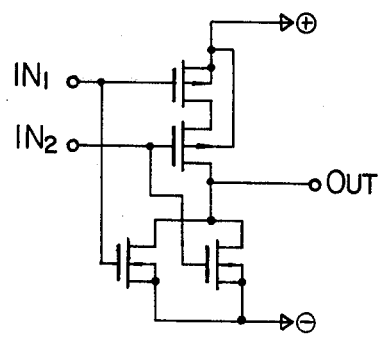
Figure 6B:
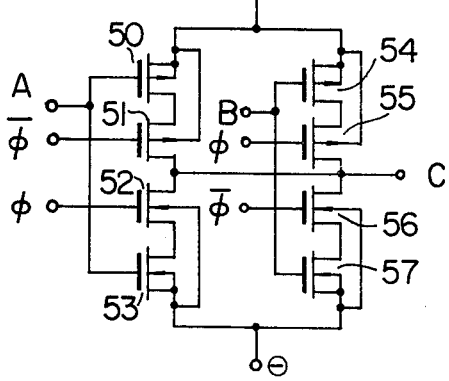
Figure 6C:
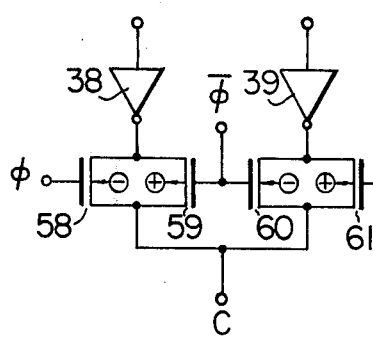
Figure 6D:
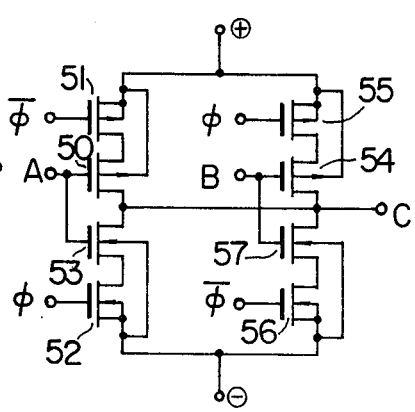

FIG. 1 is a block diagram of an embodiment of a motor driving system according to the present invention which is shown for affording a better understanding of a basic principle of the present invention. In the present system, a pulse signal of very high frequency generated by an oscillator 1 is frequency divided by a frequency divider 2 consisting of a multistage cascade-connected binary counter to produce a pair of pulses Q and $\overline{Q}$ of opposite phase to each other and of low frequency suitable to drive a motor 6, the thus produced pulses are then supplied to a shaping circuit 33 to produce reference pulse signals D and E of opposite phase to each other having a predetermined pulse width suitable to drive the motor 6. In the present specification the circuits 1, 2, and 3 are hereinafter collectively referred to as a reference pulse generating circuit. Then, through a signal transmission path switching circuit 4 which is controlled by a motor driving signal control circuit 8 to be described later, there are produced pulses $C_1$ and $C_2$ of phases different from each other in correspondence with the signals D and E, the pulses $C_1$ and $C_2$ are then fed to a pair of output buffers which constitute a motor driving circuit 5 to produce motor driving signals OUT 1 and OUT2 of phases different from each other for driving the stepping motor 6. A motor driving signal control circuit 8 receives at its inpt terminals the output signals OUT1 and OUT2 and a reset signal R and an inverted signal $\bar{R}$ thereof from a reset signal generating circuit 7, and when the reset signal is delivered (R = 1) the motor driving signal control circuit 8 produces an output signal G having a voltage level which is determined by which of the output signals OUT1 and OUT2 has been produced during the motor stepping period just prior to the application of the reset signal, and at the same time it holds that voltage level of the output signal G even after the release of the reset (R = 0), until next reset signal is applied. The output signal G is applied to the motor driving signal transmission path switching circuit 4 to determine whether, after the release of the reset, the output signals D and E from the shaping circuit 3 are to be transmitted to the motor driving circuit 5 while the signal transmission paths remain unchanged or they are to be transmitted while the signal transmission paths are exchanged with each other. In other words, accordingly as the output signal applied to a motor just prior to the reset is OUT1 or OUT2, one of the reference signals D and E which first appears after the release of the reset is connected through the signal transmission path switching circuit to the buffer circuit which produces the output signal OUT2 or OUT1. As a result, the pulse current which is first supplied to the motor after the release of the reset is of opposite polarity to that of the pulse current just prior to the reset and, therefore, the motor is positively re-started. The frequency divider 2 may be composed of a number of cascade-connected flip-flop stages, each stage being maintained to a reset state when it receives a reset signal (e.g. Q = 0, $\bar{Q}$ = 1), and switched to a set state upon release of the reset to carry out normal operation and produce an output pulse signal at a predetermined one of Q and $\bar{Q}$ a predetermined time period (e.g. 1 second or 1 minute) after the release of the reset.

With the above construction, if, in order to adjust the time of a watch, a reset signal is generated to stop the motor and the reset is released after a second hand or minute hand has been adjusted, it is possible to assure that the second hand or minute hand which is linked in a predetermined relation to the motor starts to move in a normal manner automatically and electronically a predetermined time period (e.g. 1 second or 1 minute) after the release of the reset.

FIG. 2 is a logical circuit diagram of an electronic watch of one embodiment of the present invention in which the system shown in FIG. 1 is embodied in a hand indication type electronic watch. It should be noted that the configuration of FIG. 2 is shown for the purpose of illustrating the operation of the present invention in detail and the present invention is by no means restricted to the specific embodiment.

Figure 10A:
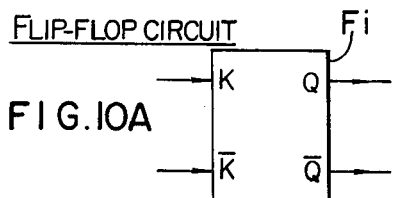
Figure 10B:
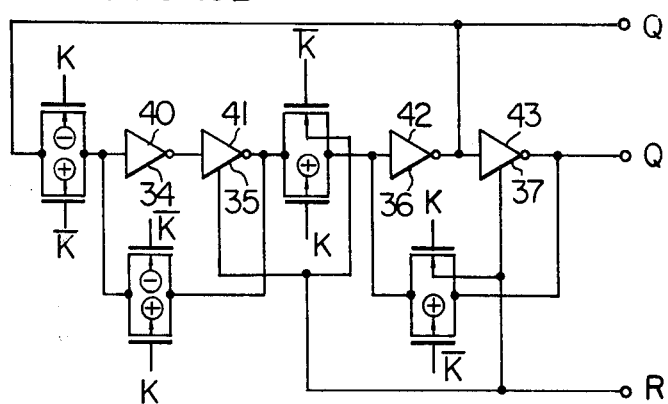
Figure 10C:
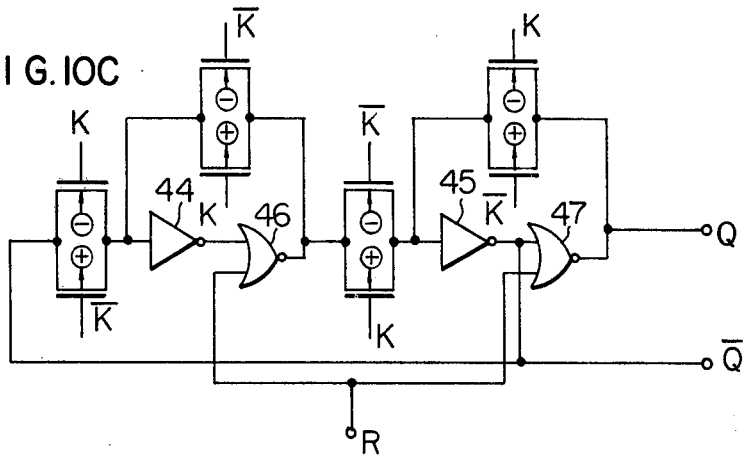

For the purpose of facilitating the understanding, those circuit blocks which functionally correspond to those of FIG. 1 are encircled by dotted lines and represented by the same reference numbers. The logical symbols and logic circuit blocks in FIG. 2 may be constructed in accordance with FIGS. 3A to 11B which show corresponding specific circuits constructed by complementary MOS's together with the symbols and blocks. In an electronic watch which employs a CMOS IC for watch, a metal case of the watch is usually connected to a positive terminal of a power supply. The circuit operation herein is explained using positive logic. Referring to FIG. 2, the oscillator 1 comprises a quartz crystal 9, inverters 10 to 12, resistors $R_f$ and $R_d$, and capacitors $C_G$ and $C_D$, and it generates a square wave of 32,768 Hz. The terminals marked with ⊕ and ⊖ in the drawings indicate that they are connected to a positive ⊕ terminal and negative ⊖ terminal, respectively, of a power supply (e.g. mercury cell). The frequency divider 2 comprises 16 cascade-connected flip-flops F1 to F16. When reset (R = 1), a reset signal R is applied to each of the flip-flop stages so that the outputs $Q_1$ to $Q_{16}$ of the stages are maintained at a low level or 0 and the inverted outputs $\bar{Q}_1$ to $\bar{Q}_{16}$ are maintained at a high level or 1. When the reset signal is released (R = 1 → 0) the flip-flops function as a normal binary counter after that moment. Each of the flip-flop stages may be constructed by a circuit shown in FIG. 10B or 10C. NAND gates 14, 15 and 16 constitute the shaping circuit 2 which receives the outputs from the flip-flops and produces output signals for generating a pair of motor driving signals of an appropriate pulse width and of phases different from each other. The NAND gate 14 and ganged switches SW2 and SW3 are provided to effect fine adjustment of the pulse widths of the output pulses D and E from the NAND gates 15 and 16, taking into consideration an electrical characteristic and power consumption of the motor used. For example, when the switches SW2 and SW3 are set to the positions shown in FIG. 2, reference pulses of approximately 7.8 m sec. width (which corresponds to the width of the output pulse of the flip-flop $F_9$) are produced at the output terminals of the NAND gates 15 and 16, respectively, at a rate of one for every two seconds. That is, the reference pulses are delivered every one second from either the NAND gate 15 or 16. On the other hand, when the switches SW2 and SW3 are thrown in the direction shown by the arrow in FIG. 2, the reference pulses of approximately 11.7 m sec. width (which corresponds to the period of the output pulse of the flip-flop $F_9$ less the pulse width of the output pulse $F_8$) are produced at the output terminals of the NAND gates 15 and 16. It is thus seen that the reference pulse having a desired pulse width can be obtained by connecting the input terminals of the NAND gate 14 to the outputs of appropriate flip-flop circuits. The reset signal generating circuit 7 comprises a resetting switch SW1 having its one terminal connected to the positive terminal ⊕ of the power supply and the other terminal connected to the negative terminal ⊖ through an N-channel MOSFET 24, an NAND gate 25 and an inverter 26. During the normal operation of the watch, the switch SW1 is opened as shown in the drawing and a potential at the input terminal of the NAND gate 25 coupled to the switch SW1 is at a negative level or 0 because of the MOSFET 24. Therefore, a set status of $\bar{R}$ = 1 and R = 0 is maintained. On the other hand, for reset, the switch SW1 is closed and the potential at the input terminal of the gate 25 coupled to the switch SW1 assumes 1 level. In this state, the state of $\bar{R}$ = 0 and R = 1 occurs, that is, a reset signal is produced only when both outputs of the NAND gates 15 and 16 are 1. In other words, as will be described in connection with the relation between the signals D and E and the motor driving signals OUT1 and OUT2, the NAND gate 25 serves to prevent the waveforms of the motor driving pulse signals from being deformed by the reset signal for the period during which the motor driving pulse signal OUT1 or OUT2 is produced by the low level pulses $\overline{D}$ and $\overline{E}$ which appear in the reference signals D and E, that is, for the period of the motor drive. Namely, the NAND gate 25 constitutes an inhibit circuit which inhibits the occurrence of the reset signal when the pulse driving pulse is up.

The output signal waveforms of the respective stages of the frequency divider as well as the output signal waveforms of the NAND gates 15 and 16 are shown in FIGS. 12A and 12B with a reset release time being represented at 0 second. As seen from the drawings, a low level 0 pulse first appears in the output signal E from the NAND gate 16 just one second after the reset release, and thereafter the pulses appear in output signals D, E, D, E, . . . in this order for every second.

Referring back to FIG. 2, the signal transmission path switching circuit 4 comprises electronic switches 17 and 18 for transmitting the output signals from the NAND gates 15 and 16 to the motor driving circuit 5. The switches 17 and 18 are constructed by the circuit shown in FIG. 6B, 6C or 6D, and respond to the signal G appearing at the output terminal of the motor driving signal control circuit 8 to be described later, or a control signal $\phi$ for transmitting the pulses $\overline{D}$ and $\overline{E}$ to the input terminals of the inverters 19 and 20, respectively, of the driving circuit, or transmitting them to the input terminals of the inverters 20 and 19, respectively, by exchanging the signal transmission paths for the pulses $\overline{D}$ and $\overline{E}$. The operation of the signal transmission path switching circuit is now explained with reference to a circuit of FIG. 6B used therefor. In the block 17, for example, since $\overline{\phi}$ is 0 when the control signal $\phi$ is 1, an enhancement mode P-channel MOSFET 51 and an enhancement mode N-channel MOSFET 52 are turned on while an enhancement mode P-channel MOSFET 55 and an enhancement mode N-channel MOSFET 56 are turned off, resulting in an inverted signal $\overline{A}$ of a signal A at an output terminal C. On the other hand, when the control signal $\phi$ is 0, since the $\overline{\phi}$ is 1 the MOSFET's 55 and 56 are turned on and the MOSFET's 51 and 52 are turned off, resulting in an inverted signal $\overline{B}$ of a signal B at the output terminal C.

The output signals $C_1$ and $C_2$ produced in the switching circuit 4 of FIG. 2 by the above operation are applied to the motor driving circuit 5 comprising inverters 19 and 20 and output buffers 21 and 22 for producing the motor driving signals OUT1 and OUT2 having a desired pulse width. These signals are directly applied across a stator coil 23 of the motor to pass an inverting current $i$ through the coil. The output buffers 21 and 22 are each constructed to have an on-resistance of approximately 100 Ω to 200 Ω and an input capacitance $CX_1$ or $CX_2$ of several tens pF (20 to 60 pF) and hence they occupy very large area on a semiconductor chip as compared with a conventional inverter such as 19 or 20.

The motor driving signal control circuit 8 in FIG. 2, which is one of the features of the present invention, comprises a latch circuit including two NOR gates which receive the motor driving signals OUT1 and OUT2 at inputs thereof, transfer gates 29 and 32 the switching of which is controlled by the reset signal R or $\overline{R}$, and inverters 30 and 31. The transfer gates 29 and 32 may be constructed by the CMO's as shown in FIGS. 7B and 8B. Accordingly, the control circuit 8 can be actually constructed by the NOR circuit of FIG. 5B, the inverter circuit of FIG. 3B and the transfer gate circuit of FIGS. 7B and 8B. The combined circuit of the inverter 31 and the transfer gate 32 included in the control circuit 8 and shown in FIG. 9A need not be constructed by connecting the respective circuits but it may be a single circuit as shown in FIG. 9B. Because of the presence of the latch circuit, 1 or 0 signal appears at a point F of the control circuit 8 depending on which of the motor driving pulse signals OUT1 and OUT2 is active, but a potential at the output terminal is not affected by the signal appearing at the point F during the normal reset state (R = 0) because the transfer gate 29 is turned off and the motor driving pulse discrimination signal at the point F is not applied to the suceeding inverter 30. When a reset signal is applied to stop the motor for adjusting the time, the reset signal R is switched to 1 and the transfer gate 29 is turned on so that the motor driving pulse discrimination signal stored at the point F, which has been produced just prior to the reset, is applied to the inverter 30 and the inverted signal appears at the output terminal. For example, when the reset is issued immediately after the pulse signal 1 has been sent to the motor from the OUT1, the potential of the point F assumes 1 level and the potential of 0 level appears at the output terminal. On the other hand, when the reset is issued immediately after the pulse signal 1 has been issued from the OUT2, the potential of the point F assumes 0 level and the potential of 0 level appears at the output terminal. During the reset period, since $\overline{R} = 0$ and the transfer gate 32 is off, no closed loop is formed in the circuit comprising the inverters 30 and 31 and the transfer gate 32, and the signal level at the output terminal is maintained by the latch circuit comprising the NOR gates 27 and 28. When the reset is released by the operation of the switch SW1 to assume the normal set state (R = 0 and $\overline{R} = 1$), the gate 29 is turned off while the transfer gate 32 is turned on, and the signal level at the output terminal is maintained by a closed loop formed by the inverter 31, the transfer gate 32 and the inverter 30. This maintained state continues until a new reset is issued and the above operation is again caused. The signal level thus appeared at the output terminal is effectively used as the control signal $\phi$ for the motor driving signal transmission path switching circuit 4. To better understand the operation of the circuit, actual operation thereof is now explained with reference to FIGS. 13 to 16. The waveforms shown therein illustrate four possible operation modes in the actual operation, and the respective drawings shown time charts for the reset signal, the output signals D and E of the NAND gates 15 and 16, the output signals of the buffers 21 and 22, i.e. the motor driving signals OUT1 and OUT2, the signal at the point F of the control circuit, and the signal G at the output terminal of the control circuit. FIGS. 13 and 14 illustrate the time charts when the potential of the signal G is maintained at 0 while the circuit is operating in the normal mode prior to the reset, wherein FIG. 13 shows the time chart when the output pulse is produced in the OUT1 immediately before the reset signal is issued, that is, when the motor is stopped immediately after the drive pulse in the OUT1 is issued, and FIG. 14 shows the time chart when the output pulse is produced in the OUT2 immediately before the reset signal is issued, that is, when the motor is stopped immediately after the drive pulse in the OUT2 is issued.

In FIG. 13, since the level of the signal G or the control signal $\phi$ is maintained at 0 before the reset, the switching circuit 4 operates to change the signal transmission path, such that the signal E from the NAND gate 16 is transmitted to the drive circuit for the OUT2 and the signal D from the NAND gate 15 is transmitted to the drive circuit for the OUT1. Since the reset signal is issued after the pulse 60 in the OUT1 has been produced, the potential at the point F assumes 1 level and hence the level of the signal G is maintained at 0 even after the release of the reset. Namely, even after the release of the reset the signal transmission path is switched by the switching circuit 4 as in the case before the reset so that the pulse $\bar{D}$ is transmitted to the OUT1 while the pulse $\bar{E}$ is transmitted to the OUT2. On the other hand, as stated above, at the time moment when one second has elapsed after the release of the reset, the pulse $\bar{E}$ is first produced in the output E of the NAND gate 16 by the frequency divider having a reset function, and the first motor drive pulse 61 is produced in the OUT2 after the release of the reset. Accordingly, the motor which has been stopped by the pulse in the OUT1 is first driven, after the release of the reset, by the pulse in the OUT2 which produces a motor current having the plarity opposite to that of a motor current which passed just prior to the reset, and hence the rotation of the motor is fully assured.

In FIG. 14, since the reset is issued immediately after the pulse 62 in the OUT2 has been produced, the point F assumes 0 level during the reset and the signal G is at 1 level because the gate 29 is turned on upon the issuance of the reset signal. Therefore, after the release of the reset, the prior signal transmission path is changed such that the pulse $\bar{D}$ is transmitted to the OUT2 while the pulse $\bar{E}$ is transmitted to the OUT1. Accordingly, after the release of the reset, the first motor driving pulse 63 is produced in the OUT1.

FIGS. 15 and 16 show the timing charts when the level of the signal G before reset is 1 wherein FIG. 15 shows the timing chart when the reset is issued immediately after the pulse 64 in the OUT signal 2 has been produced. In this case, the point F maintains 0 level during the reset period by the pulse 64 and the signal G maintains 1 level even after the release of the reset. Accordingly, even after the release of the reset, the signals D and E are transmitted down the same signal transmission path as before and the first pulse 65 is produced in the OUT signal 1 one second after the release of the reset. In FIG. 16, since the level of the signal G changes from 1 to 0 simultaneously with the issuance of the reset signal, the prior signal transmission paths for the signals D and E are changed such that the signals D and E are transmitted to the OUT1 and OUT2, respectively, and the first motor driving pulse 67 after the release of the reset is produced in the OUT signal 2. The above operation can also be expressed in another way, when the reset is issued after the pulse has been produced in the OUT1, there is produced a control signal for designating the signal transmission path by which the output E produces the OUT2, irrespectively of the signal transmission path before the reset, and the first pulse $\bar{E}$ that appears after the release of the reset produces the drive pulse in the OUT2. On the other hand, when the reset is issued immediately after the pulse has been produced in the OUT2, there is produced a control signal for designating the signal transmission path by which the output E produces the OUT1. In any case, after the release of the reset, there appears a drive pulse capable of passing a motor current having the plarity opposite to that of a motor current which passed just prior to the reset.

As described hereinabove, in accordance with the motor driving system of the present invention, the drive of the motor after the release of the reset is fully assured and the motor starts a predetermined rotation at a predetermined time.

While the above embodiment produces the first motor driving pulse one second after the release of the reset, it should be understood from the above operation that the first reference pulse can be produced after the elapse of any predetermined time period by changing the number of stages of the flip-flops of the frequency divider or the oscillation frequency of the oscillator.

Furthermore, according to the motor driving system of the present invention, the erroneous operation of the circuit due to pulsive noise or whisker pulse can be significantly reduced as described hereinafter.

Figure 17:
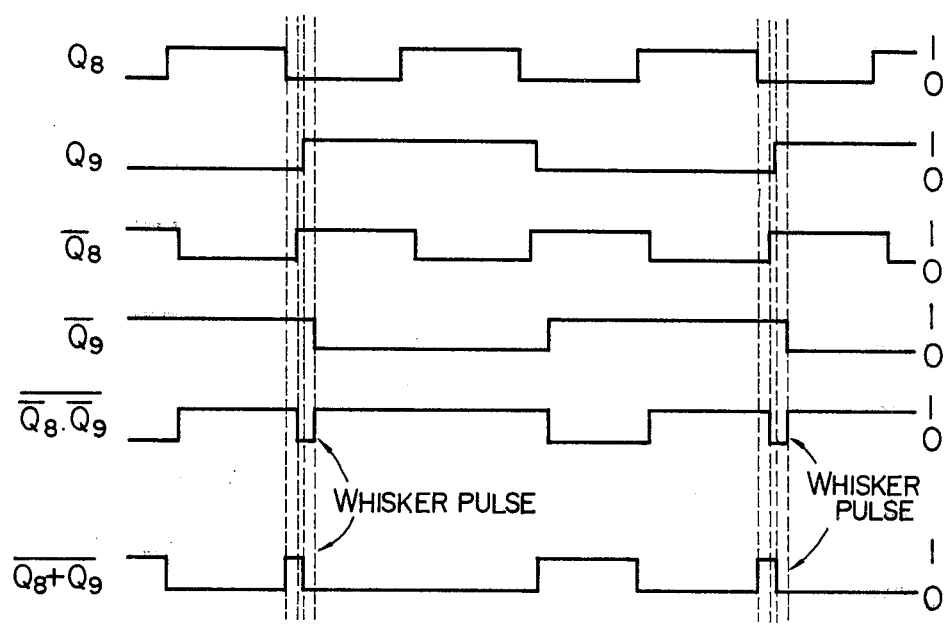
FIG. 17 shows pulse waveforms for illustrating the generation of a whisker pulse in a gate circuit by the delay between input signals.

In general, when a complex circuit is integrated on a single semiconductor chip by IC technology, a signal is frquently delayed due to a transmission characteristic of various gate circuits and a parasitic impedance of circuit components and wiring. For example, when a binary counter or a flip-flop which is operated by a negative-going pulse is used, a NOR gate which receives the outputs $Q_1, Q_2, \ldots Q_n$ of the binary counter as inputs thereto or a NAND gate which receives the other outputs $\bar{Q}_1, \bar{Q}_2, \ldots \bar{Q}_n$ as inputs thereto frequently generates pulsive noise or whisker pulses in the output of the NOR gate or the NAND gate due to the above-mentioned delay characteristics. For example, in FIG. 2, the NAND gate 14 which receives $\bar{Q}_8$ and $\bar{Q}_9$ as inputs thereto may be constructed by a NOR gate which receives $Q_8$ and $Q_9$ as inputs thereto and an inverter, instead of the illustrated circuit, but in any case the pulsive noise or whisker pulses are generated due to the delay between the gate inputs. FIG. 17 shows an output signal of an NAND gate which receives the signals $Q_8$ and $Q_9$ as inputs thereto, and an output signal of a NOR gate which receives the signals $\bar{Q}_8$ and $\bar{Q}_9$ as inputs thereto. In either case the whisker pulses as shown are produced due to a slight delay between the input signals. In actual fact, when the circuit is formed by IC technique, the layout of the circuit is designed to avoid the occurrence of such noise, but once such noise occurs the circuit operates erroneously and the electronic device may have to be regarded as a defect product. For example, in the electronic watch discussed in the embodiment of the present invention, the pulsive noise may adversely affect the rotation of the motor. On the contrary, in the present invention, even if the NAND gate 14 generates the sharp pulsive noise or whisker pulse as shown in FIG. 17, such pulsive noise or whisker pulse can be suppressed by the gate circuits 15 and 16 having low operating speed and the output buffers 21 and 22 having very large input capacitance so that pure effective signal waveform which are substantially free from such noise component can be obtained for the motor drive signals OUT1 and OUT2. Furthermore, since the driving signal control circuit 8 is operated by those output signals, the control circuit is not erroneously operated by the noise pulse or whisker pulse. From the operation principle of the present invention, it can be considered to connect the input terminals of the latch circuit comprising the NOR gates 27 and 28 to the outputs $C_1$ and $C_2$ of the signal transmission path switching circuit 4 rather than to connect it to the outputs of the buffers 21 and 22. However, since the latch circuit is very likely to be erroneously operated with ease by the whisker pulse, it is desirable to connect the input terminals of the latch circuit to the output terminals of the buffers 21 and 22 having large input capacitances $CX_1$ and $CX_2$ (approximately 20 to 60 pF), as shown in FIG. 2, in an electronic device which requires high reliability.

While the complementary MOSFET IC's are employed in the circuit arrangement of the electronic watch according to the present invention which requires a small power consumption, it should be understood that the scope of the present invention is not limited to those specific circuits but any other commonly known circuits may be used to construct the present system.

What is claimed is:

1. A motor driving system comprising:
   a reference signal generating circuit for generating a pair of reference signals of different phase from each other;
   a motor driving circuit responsive to said pair of reference signals for producing a pair of motor driving signals for causing drive currents of opposite polarity to each other to be alternately fed to a motor;
   a signal transmission path switching circuit connected between said reference signal generating circuit and said motor driving circuit for switching the paths which transmit said reference signals to said motor driving circuit;
   a control circuit for receiving said motor driving signals at an input thereof and supplying an output thereof as a control signal to said signal transmission path switching circuit, and
   a reset circuit connected to said reference signal generating circuit and said control circuit for generating a reset signal which deactuates said reference signal generating circuit and causes said control circuit to produce and maintain an output signal corresponding to the status of the motor driving signals,
   whereby the signal transmission path corresponding to the status of the motor driving signal at the time of the reset is selected and the reference signal is transmitted to the motor driving circuit through the selected signal transmission path at the release of the reset.

2. A motor driving system according to claim 1, wherein said system is constructed in the form of a complementary MOS integrated circuit.

3. A motor driving system comprising:
   a reference signal generating circuit for producing one of a pair of reference signals of different phase from each other in preference to the other when it is set and thereafter producing said pair of reference signals alternately;
   a motor driving circuit responsive to said pair of reference signals to alternately produce a pair of motor driving signals of different phase from each other;
   a signal transmission path switching circuit connected between said reference signal generating circuit and said motor driving circuit for switching the paths which transmit said reference signals to said motor driving circuit;
   a control circuit for receiving said motor driving signals at an input thereof and supplying an output thereof as a control signal to said signal transmission path switching circuit, and
   a reset circuit connected to said reference signal generating circuit and said control circuit for generating a reset signal which deactuates said reference signal generating circuit and causes said control circuit to produce and maintain an output signal corresponding to the motor driving signal applied to said control circuit;
   said signal transmission switching circuit being controlled by said maintained signal to select the signal transmission path which allows to transmit said preference reference signal to the motor driving signal which is different from that motor driving signal which has been applied to the control circuit at the time of the reset,
   whereby the motor driving signal which is different from that motor driving signal which was present immediately before the reset is produced in preference at the time of the release of the reset.

4. A motor driving system according to claim 3, wherein said motor driving signals actuate a motor for an electronic watch.

5. A motor driving system according to claim 3, wherein said system is constructed in the form of a complementary MOS integrated circuit.

6. A motor driving system according to claim 5, wherein said motor driving signals actuate a motor for an electronic watch.

7. A motor driving circuit comprising:
   an oscillator for generating a square wave signal having a given frequency;
   a frequency divider connected to said oscillator and including a plurality of cascade-connected flip-flops;
   a shaping circuit including a set of gate circuits each receiving desired ones of the outputs of said flip-flops, said set of gate circuits producing a set of reference signals of different phase from each other each having a desired period and pulse width;
   a signal transmission path switching circuit including a set of electronic switching circuits having their input terminals connected to the outputs of said gate circuits and having control terminals;
   a motor driving circuit connected to the output terminals of said electronic switching circuits and including a set of buffers for producing a set of motor driving signals of different phase from each other;
   a control circuit including a latch circuit and transfer gates and receiving said set of motor driving signals at an input thereof and supplying an output thereof to the control terminals of said electronic switching circuits, and
   a reset circuit including a switch and connected to said flip-flops and said transfer gates for producing a reset signal which deactuates said flip-flops and renders said transfer gates conductive,
   whereby the control signal corresponding to that motor driving signal which has been applied immediately before the reset is supplied to the electronic switching circuits, and the motor driving signal which is different from that motor driving signal which was present immediately before the reset is produced in preference at the time of the release of the reset.

8. A motor driving circuit according to claim 7, wherein said motor signals actuate a motor for an electronic watch.

9. A motor driving circuit according to claim 7, wherein said shaping circuit further includes means for changing over those outputs of the flip-flops which are applied to the gate circuits and determine the pulse widths of the reference signals, whereby the pulse widths of the reference signals can be selected.

10. A motor driving circuit according to claim 7, wherein said reset circuit further includes a gate circuit having its input terminals connected to said reset switch and the output terminals of said shaping circuit, whereby the resetting during the presence of the reference signal is prevented.

11. A motor driving circuit according to claim 7, wherein a portion of the frequency divider, the shaping circuit, the signal transmission path switching circuit, the motor driving circuit and the control circuit are constructed by complementary MOSFET inverters, respectively.

12. A motor driving circuit according to claim 9, wherein a portion of the oscillator, the frequency divider, the shaping circuit, the signal transmission path switching circuit, the motor driving circuit and the control circuit are constructed by complementary MOSFET inverters, respectively.

13. A motor driving circuit according to claim 10, wherein the circuit components used in a portion of the oscillator, the frequency divider, the shaping circuit, the signal transmission path switching circuit, the motor driving circuit, the control circuit and the gate circuit of the reset circuit are constructed by complementary MOSFET inverters, respectively.

14. A motor driving circuit according to claim 7, wherein a portion of the oscillator, the frequency divider, the shaping circuit, the signal transmission path switching circuit, the motor driving circuit and the control circuit are constructed in a complementary MOS integrated circuit structure.

15. A motor driving circuit according to claim 9, wherein a portion of the oscillator, the frequency divider, the shaping circuit, the signal transmission path switching circuit, the motor driving circuit and the control circuit are constructed in a complementary MOS integrated circuit structure.

16. A motor driving circuit according to claim 10, wherein a portion of the oscillator, the frequency divider, the shaping circuit, the signal transmission path switching circuit, the motor driving circuit, the control circuit and the gate circuits of the reset circuit are constructed in a complementary MOS integrated circuit structure.

17. A motor driving circuit according to claim 16, wherein the motor driving currents actuate a motor for an electronic watch.

* * * * *